(12) United States Patent
Geurts et al.

(10) Patent No.: US 9,104,694 B2
(45) Date of Patent: Aug. 11, 2015

(54) METHOD OF SEARCHING IN A COLLECTION OF DATA ITEMS

(75) Inventors: Lucas Jacobus Franciscus Geurts, Eindhoven (NL); Johan Partomo Djajadiningrat, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 348 days.

(21) Appl. No.: 12/811,390

(22) PCT Filed: Jan. 5, 2009

(86) PCT No.: PCT/IB2009/050005
§ 371 (c)(1),
(2), (4) Date: Jul. 1, 2010

(87) PCT Pub. No.: WO2009/087582
PCT Pub. Date: Jul. 16, 2009

(65) Prior Publication Data
US 2010/0287195 A1   Nov. 11, 2010

(30) Foreign Application Priority Data

Jan. 10, 2008  (EP) ..................... 08150141

(51) Int. Cl.
*G06F 17/30*  (2006.01)

(52) U.S. Cl.
CPC ...... *G06F 17/30241* (2013.01); *G06F 17/3087* (2013.01)

(58) Field of Classification Search
CPC ................... G06F 17/30241; G06F 17/30017; G06F 17/3084; G06F 17/30; G06F 2221/2111; G06F 3/0346
USPC .......................................... 707/999.003, 769
See application file for complete search history.

(56) References Cited

U.S. PATENT DOCUMENTS

| | | | |
|---|---|---|---|
| 4,975,671 A | 12/1990 | Dirks | |
| 6,760,770 B1* | 7/2004 | Kageyama | 709/229 |
| 2002/0067353 A1* | 6/2002 | Kenyon et al. | 345/419 |
| 2004/0015706 A1* | 1/2004 | Eshghi et al. | 713/189 |
| 2005/0162523 A1* | 7/2005 | Darrell et al. | 348/211.2 |
| 2007/0002127 A1 | 1/2007 | Yang et al. | |

(Continued)

FOREIGN PATENT DOCUMENTS

| | | |
|---|---|---|
| EP | 1199646 A2 | 4/2002 |
| FR | 2875320 | 3/2006 |

(Continued)

OTHER PUBLICATIONS

Simon et al: "Towards Orientation-Aware Location Based Mobile Services"; 3rd Symposium on LBS and Telecartography, Vienna, Austria, Nov. 2005, 8 Page Document.
Hansen, F.: "Context-Aware Mobile Hypermedia Systems"; University of Aarhus, Department of Computer Science, Arhus, Denmark, Ph.D. Progress Report, Feb. 2005, 48 Page Document.

(Continued)

*Primary Examiner* — Yuk Ting Choi (57) ABSTRACT

A method of searching in a collection of data items stored in association with data representative of locations includes obtaining data representative of co-ordinates defining a location. Data representative of a direction are obtained. A system (22,28) for searching in the collection is caused to use the data representative of the direction and the co-ordinates to identify data items stored in association with data representative of locations within a spatial range determined by at least the direction and the co-ordinates.

13 Claims, 5 Drawing Sheets

(56) References Cited

U.S. PATENT DOCUMENTS

2007/0115373 A1* 5/2007 Gallagher et al. ......... 348/231.3
2008/0140638 A1   6/2008 Bruno

FOREIGN PATENT DOCUMENTS

WO    2005076149 A1   8/2005
WO    2006030133 A1   3/2006

OTHER PUBLICATIONS

Davis et al: "From Context to Content: Leveraging Context for Mobile Media Metadata"; University of California At Berkely School of Information Management and Systems and Helsinki Institute for Information Technology, 2004, 7 Page Document.

Toyama et al: "Geographic Location Tags on Digital Images"; MM'03, Nov. 2003, 11 Page Document.

\* cited by examiner

METHOD OF SEARCHING IN A COLLECTION OF DATA ITEMS

FIELD OF THE INVENTION

The invention relates to a method of searching in a collection of data items stored in association with data representative of locations.

The invention also relates to a mobile device.

The invention also relates to a system for searching in a collection of data items stored in association with data representative of locations.

The invention also relates to a computer programme.

BACKGROUND OF THE INVENTION

WO 2005/076149 discloses a hand-held device (sometimes referred to as a mobile deixis device) having a camera to capture an image of an object. The hand-held device further includes a wireless communication device coupled to the camera and to a wireless network to communicate the image to a computer having a database. In the computer, a web database is created having images of known objects, wherein the associated text which describes features of the object in the image typically includes geographical location information of the object. Using the hand-held device, an image-based query can be formed simply by pointing with the camera and snapping a photo. The image is used to find matching images of the same location. In an embodiment, the mobile deixis device includes a global positioning system receiver to identify the geographical location of the mobile communication device to help eliminate non-useful images. In an alternative embodiment, a GPS co-ordinate-based query to retrieve from a web site such as www.mapquest.com a map covering the surrounding area can be obtained, and used to refine further the results of the image-based search.

An image-based search generally requires a high level of data processing power to perform the actual image matching, which is therefore generally not carried out in a mobile device. This in turn requires the communication of the captured image data to a remote data processor like the computer, so that a wireless connection with a relatively high bandwidth is also required.

SUMMARY OF THE INVENTION

It is an object of the invention to provide a method, mobile device, system and computer programme of the types mentioned above in the opening paragraphs to provide a system for providing location-based data that can be implemented relatively efficiently, imposing lower requirements on at least the device from which the search request originated.

This object is achieved by the method according to the invention, which includes:

obtaining data representative of co-ordinates defining a location;

obtaining data representative of a direction;

causing a system for searching in the collection to use the data representative of the direction and the co-ordinates to identify data items stored in association with data representative of locations within a spatial range determined by at least the direction and the co-ordinates.

By causing a system for searching in the collection to use data representative of a direction and co-ordinates to identify data items stored in association with data representative of physical locations, the need to capture an image at a particular location in order to formulate a search query is obviated. It is thus also not necessary to transmit such a captured image. By using data representative of co-ordinates to identify data items stored in association with data representative of physical locations within a spatial range determined by at least the direction and the co-ordinates, a search can be targeted more accurately to certain relevant results. Thus, fewer data items are returned as results, which is again an advantage in distributed systems in which the query originates from a device other than the one carrying out the search and returning the results.

An embodiment of the method includes obtaining data representative of an angle and using the angle as a field of view to define the spatial range.

An effect is that a parameter—the data representative of an angle—is employed to enable the search for relevant data items to be widened or narrowed. The further parameter allows a compass sector to be adjusted in size to capture more of fewer data items (by enlarging or narrowing the spatial range through variation of the angle).

An embodiment includes ordering the identified data items according to distances between the respective locations represented by the data stored in association with those data items and the location defined by the co-ordinates.

An effect is that the results most likely to be relevant are provided first. It is likely that someone requesting information connected to a particular location is more interested in those data items pertaining to locations close to that particular location. Moreover, the data items can be used in an order corresponding to the movement of a user from the particular location in the direction used to identify the data items.

In an embodiment, the data items are identified by:

identifying a set of data items stored in association with data representative of locations within a certain distance from the location, and identifying within the set of data items those stored in association with data representative of locations within a sector oriented according to the direction.

An effect of this multi-stage process is that it allows a user to explore an environment of a particular location by varying the direction, without having to repeat the entire search of the collection of data items again. Thus, a common use case is implemented in an efficient manner.

In an embodiment, the data items are stored in association with separate respective items of metadata including the data representative of locations.

An effect is that the search can be carried out relatively efficiently, and that a collection of data items in differing formats can be searched. There is no need to parse the data forming the data items.

An embodiment of the method includes:

obtaining input data representative of at least one of a date, a time, ambient conditions and data descriptive of properties of the data items stored in association with at least some of the data items, and causing the system for searching in the collection to filter according to the input data items stored in association with data representative of locations within a spatial range determined by at least the direction and the co-ordinates.

The date will generally be the date prevailing when the data representative of co-ordinates defining a location were obtained. An effect provided by this embodiment is further that it limits search results to those likely to be relevant. For example, where the data items comprise digital photographs, the search can be limited to those photographs pertaining to the environment of the location in circumstances closely resembling those specified in the search. Thus, the method can be used to provide a mobile device without a camera with "virtual" photographic capabilities. The input data descriptive of properties of the data items can be based on user input, so as to limit the search to those types of data items that are of interest to a particular user.

In an embodiment, at least the data representative of co-ordinates defining a location are received in a communication from a remote device over a network.

Thus, in this embodiment, a system carrying out the method obtains at least the data representative of co-ordinates defining a location from the remote device, and causes a system for searching in the collection to use the data representative of the direction and the co-ordinates to identify data items stored in association with data representative of locations within a region around the co-ordinates. The data processing associated with the search is concentrated at one system, which can provide support to a relatively large number of relatively simple remote devices.

In an embodiment, at least the data representative of co-ordinates are communicated to a remote system from a mobile device.

The system provides support for the mobile device in that it carries out most of the data processing associated with the search. It receives a relatively small amount of data from the mobile device. The co-ordinates are obtained by the mobile device by means of user input, and then forwarded, in one variant of this embodiment.

In another variant, the data representative of co-ordinates defining a location are obtained from a positioning system for locating the mobile device.

An effect is that the location need not be entered by a user, making the method easier to use and less prone to mistakes.

In an embodiment, at least selected ones of the identified data items are received by the mobile device from the remote system over a network.

An effect is that location-related data are provided to a mobile device, which thus has to store a smaller range of data items itself. The data items can provide user-accessible information (audio, video, map data, etc.), turning the mobile device into an information-providing tool for the user. The data items can also comprise functional data, allowing adaptation of the functionality of the mobile device to a particular location or region in a more precise manner.

In an embodiment, the data representative of a direction are obtained using at least one sensor for determining an orientation of the mobile device.

An effect is that the method is relatively easy to use.

According to another aspect of the invention, there is provided a mobile device, including:

a system for obtaining data representative of co-ordinates of the mobile device determined by a positioning system; and a system for obtaining data representative of a direction, wherein the mobile device is arranged to provide the data representative of the direction and the co-ordinates to a system for searching in the collection to identify data items stored in association with data representative of physical locations within a spatial range determined by at least the direction and the co-ordinates.

The mobile device is able to obtain location-related data that is limited more accurately to a particular region, and to do so in a manner that does not require it to have a high-bandwidth data connection, or powerful processing capabilities for submitting the search request.

In an embodiment, the mobile device is configured to carry out a method according to the invention.

According to another aspect of the invention, there is provided a system for searching in a collection of data items stored in association with data representative of locations, including:

a system for receiving data representative of co-ordinates defining a location and for receiving data representative of a direction; and a system for searching in the collection of data items, configured to determine a spatial range based on at least the direction and the co-ordinates, and to identify data items stored in association with data representative of locations within the spatial range.

The system is able to support a number of devices for specifying the data representative of co-ordinates defining a location and data representative of a direction, which devices need not have access to a high-bandwidth connection for submitting their search requests. In addition, by identifying data items stored in association with data representative of locations within the spatial range, searches can be carried out relatively efficiently, compared, for example, to image-based retrieval systems.

An embodiment of the system is configured to carry out a method according to the invention.

According to another aspect of the invention, there is provided a computer programme including a set of instructions capable, when incorporated in a machine-readable medium, of causing a system having information processing capabilities to perform a method according to the invention, and/or to assume the functionality of a mobile device according to the invention or a system according to the invention.

BRIEF DESCRIPTION OF THE DRAWINGS

The invention will be explained in further detail with reference to the accompanying drawings, in which.

DETAILED DESCRIPTION OF THE EMBODIMENTS

Figure 1:
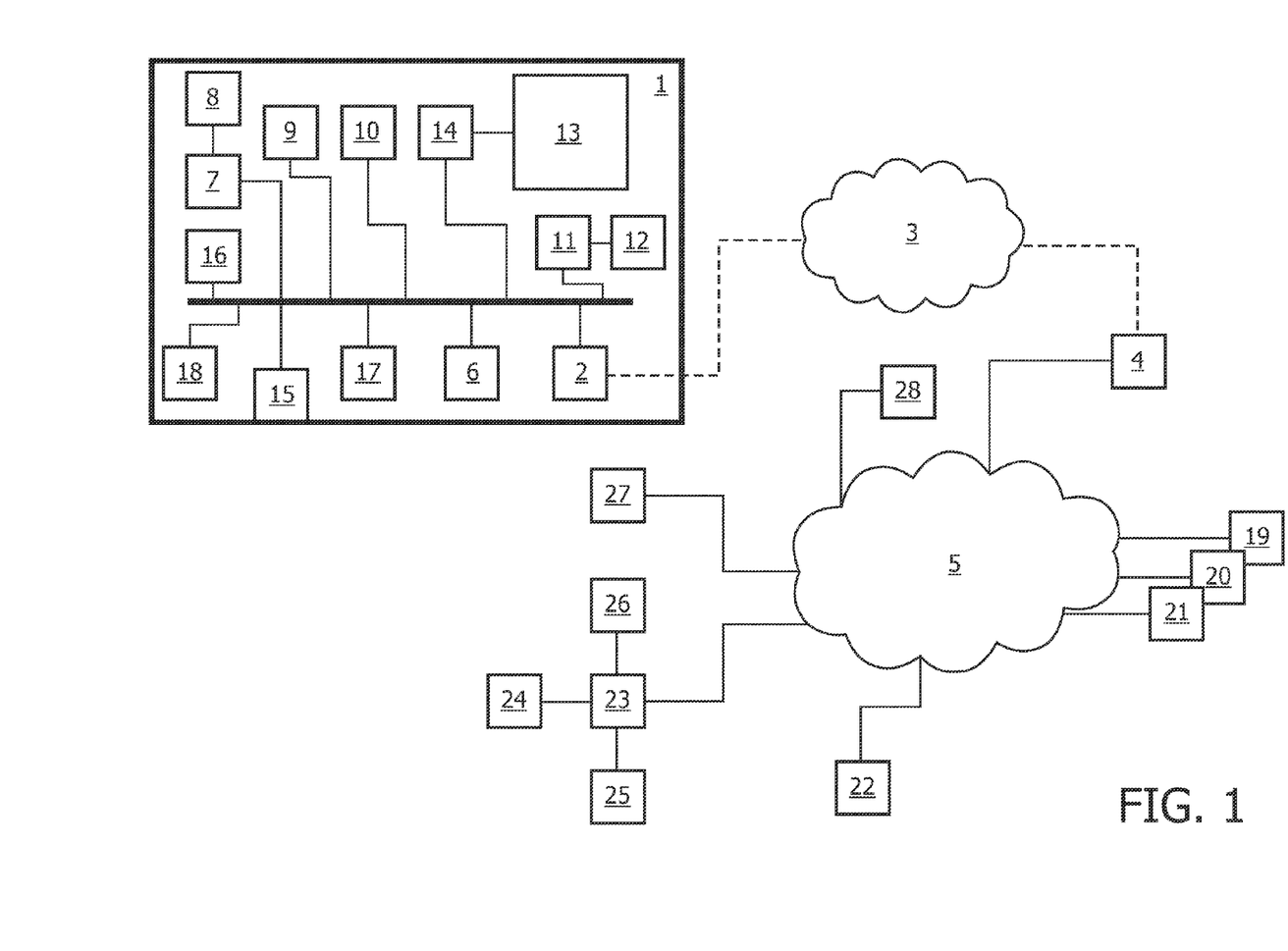
FIG. 1 is a schematic diagram of a mobile device in a network for delivering location-related information.

Referring to FIG. 1, a mobile device 1 is provided with a wireless transceiver unit 2 for a wireless network 3, e.g. a cellular telephone network, WiMax network, WiFi network, etc. In the following, it will be assumed that the wireless network 3 comprises a cellular telephone network, further including a base station 4 for interconnection to a Wide Area Network (WAN) 5, e.g. the Internet or a private Intranet. The mobile device 1 is provided with a token device, e.g. a SIM (Subscriber Identity Module) card 6 associated with a particular registered user of the wireless network 3.

The mobile device 1 can be a smart phone, a basic handset, a Personal Digital Assistant (PDA) or a car phone system. In the following, it will be assumed that the mobile device 1 is a handheld device, which is freely moveable to allow a main axis of the mobile device 1 to be pointed in any direction.

The mobile device 1 includes a data processing unit 7, main memory 8 and a data storage device 9, for executing software stored on the data storage device 9 or in non-volatile memory 10. The data storage device 9, in one embodiment, comprises a magnetic hard disk drive. In another embodiment, it comprises a solid-state memory device, which may be removable and arranged to co-operate with a reader.

The mobile device 1 is provided with an audio output stage 11 and speaker 12, forming a sound reproduction apparatus. Alternative devices can include another type of sound reproduction apparatus, e.g. using headphones and a wireless or wired interface to such headphones.

The mobile device 1 further includes a display device 13 and a video output stage 14. The display device 13 is a fixed-pixel-array display, and can be a Liquid Crystal Display, Organic Light-Emitting Diode display, or one based on electronic ink technology. It generally has a display resolution of at least 320×240 pixels, allowing it to display digital photographs, maps, etc. in a legible form.

User controls 15 are provided to allow the user of the mobile device to provide input, including data, commands, etc. The user controls 15 can include mechanical buttons, a keypad, a dial, a touch screen, etc.

The mobile device 1 is provided with a GPS (Global Positioning System) receiver 16 enabling it to obtain data representative of co-ordinates defining its geographical location. In an alternative embodiment, the mobile device 1 is arranged to obtain such data from another source, e.g. the operator of the wireless network 3 in case of a cellular telephone network. In another embodiment, the mobile device is configured to determine its current position by analysis of signals from a plurality of base stations or beacons in the wireless network 3. In a further embodiment, the mobile device 1 is configured to determine data representative of co-ordinates defining its geographical location on a map grid and in terms of its height above a reference level, e.g. using an altitude sensor (not shown).

A 6D-sensor 17 is provided to enable the mobile device 1 to generate data representative of an orientation of a main axis thereof. Such sensors are known per se and are able to measure acceleration in three dimensions, as well as pitch and yaw. Through integration of these quantities, the orientation of the mobile device 1 can be determined. In another embodiment, the mobile device 1 is configured to obtain data representative of a direction by differentiating its position as determined using the GPS receiver 16 or by determining its position and direction of travel on a road or path identified in map data loaded into the mobile device 1.

In the illustrated embodiment, the mobile device 1 also comprises a sensor 18 for sensing at least one aspect of ambient conditions. The sensor 18 can be a temperature sensor or a sensor for determining visibility conditions, for example.

Also connected to the WAN 5 are a plurality of web servers 19-21 arranged to store content in the form of data files. The data files can be in any format, e.g. HTML, xML, a word processor format, etc. They can include image data, audio data and/or character data, as well as functional data. Examples of functional data include local settings for applications executed by the mobile device 1, scripts or software executable by the mobile device 1 and application data for use by applications run on the mobile device 1 and not directly accessible to the user of the mobile device 1.

A search engine system 22 is configured to process search queries and return search results including an identification of data items stored on the web servers 19-21 that have attributes matching those specified in the search query. In one embodiment, the search engine system 22 is configured to process queries specifying map locations or grid squares, and to return data identifying data items stored with a link to metadata identifying matching map locations or grid squares to a specified degree (i.e. matching exactly or to a pre-determined level of closeness). In another embodiment, a similar search can be carried out in data items that have been parsed to locate data representative of locations within the data items. The latter embodiment would typically involve searching data items comprising data in a markup language, such as xML or HTML, with tags embedded in the data items.

A personal computer 23 is illustrated in FIG. 1, and associated with a printer device 24, a user input device 25 and a display device 26.

A mail server 27 is provided to store electronic mail messages destined for an address associated with the user of the personal computer 23 and/or the mobile device 1.

A location-based information server 28 is connected to the WAN 5, and arranged to process requests for data items pertaining to a particular spatial region. These requests may originate from the personal computer 23 or the mobile device 1, as will be explained.

Figure 2:
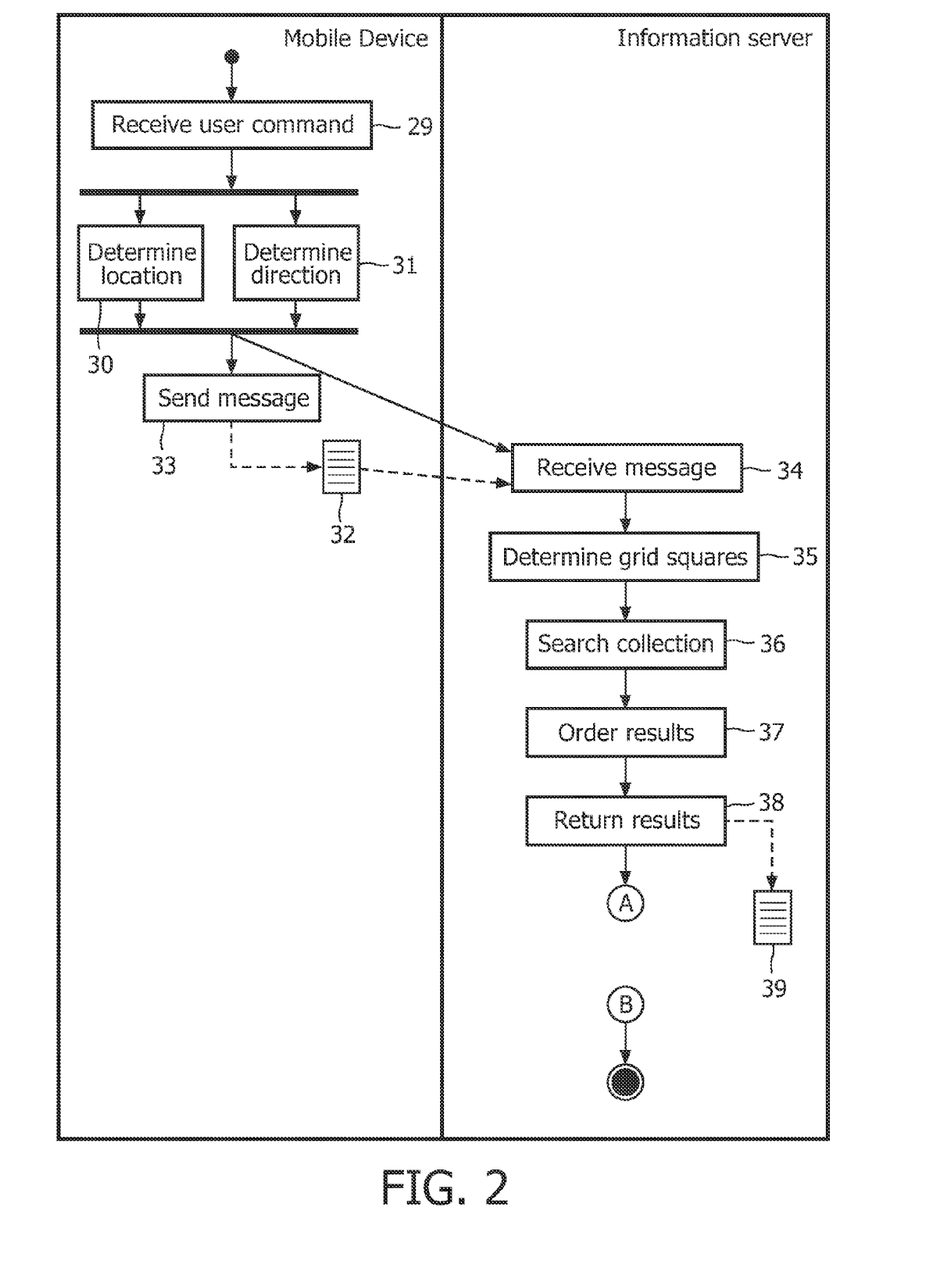
FIG. 2 is a flow chart of part of a method of providing location-related information.

FIG. 2 illustrates a process carried out when the request for location-related data items originates from the mobile device 1. In a first step 29, a user of the mobile device 1 provides a pre-determined instruction to request a data item. The instruction is provided using the user controls 15, and can be a single instruction, e.g. associated with a particular key, key combination, menu item or voice command. This is because the further information for assembling a request is obtained automatically by the mobile device 1.

In the illustrated embodiment, the mobile device 1 determines (step 30) data representative of co-ordinates defining the location of the mobile device at the time the user command was received. This step 30 involves obtaining data from a system for locating the mobile device 1, e.g. obtaining its position using the GPS receiver 16, optionally followed by further processing to refine the position data. In another embodiment, the location of the mobile device 1 is obtained using information on its location within the wireless network 3, e.g. relative to one or more base stations (not shown).

In the illustrated embodiment, the mobile device 1 further obtains (step 31) data representative of the direction along which a main axis of the mobile device 1 is oriented, using one or more signals from the 6D-sensor 17, at least as input. The direction may be a direction in two dimensions (i.e. in a horizontal plane) or in three dimensions.

In an alternative embodiment, the direction data is not (solely) obtained from a sensor but set using user controls 15. For example, there may be a dial on the user interface, allowing the user to indicate a direction without turning the entire mobile device 1. This option is suitable for mobile devices 1 that are not hand-held, e.g. car infotainment systems, etc. It is noted that this step 31 is not carried out at this stage in all variants of the method of searching in a collection of data items, as will be explained.

In the embodiment illustrated in FIG. 2, the data representative of co-ordinates defining a location and the data representative of a direction are included in a message 32, which is sent (step 33) by the mobile device 1 to the location-based information server 28. The message 32 may be in a format associated with the wireless network 3 (e.g. an SMS (Short Message Service) or MMS (Multi-media Message Service)), and translated into a message format appropriate to the WAN 5. In another embodiment, the message 32 is an electronic mail message or a message in a proprietary format, carried in IP (Internet Protocol) packets over the wireless network 3 and the WAN 5.

In one embodiment (not shown), the mobile device 1 further obtains data representative of at least one of the date and time at which the first step 29 was carried out, and of ambient conditions determined using the sensor 18 provided for that purpose. These data are added to the message 32 to narrow the search further.

The location-based information server 28 receives the message 32 (step 34). It uses the data representative of the direction and the co-ordinates to identify data items stored in association with data representative of locations within a spatial range determined by the direction, the co-ordinates, a maximum distance and an angle used as a field of view. The maximum distance is with respect to the location defined by the co-ordinates. It can be a default value or adapted iteratively. In the illustrated embodiment, the spatial range is determined (step 35) in terms of squares on a map grid. Identifications of these squares are used to cause (step 36) the search engine system 22 to search the collection of data items stored on the web servers 19-21.

In another embodiment, in particular where data items comprising functional data are searched, the system for searching in the collection of data items and the collection of data items itself, are comprised in the location-based information server 28.

In an embodiment, the search query is in an appropriate metadata format, suitable for searching in a collection of data items associated with metadata in a format for a Geographic Information System. In another embodiment, the search query is obtained by translating co-ordinate information into character-coded data specifying landmarks, e.g. the names of particular historical buildings in a city, or street names and/or district names and/or other forms of address data.

In an embodiment, a filter is applied to the data items meeting the criteria specified in the search query. Data items are filtered according to at least one of temporal data, data representative of ambient conditions and criteria based on user input. In this way, it is possible, for example, to identify only digital photographs taken at a corresponding time of the day or season of the year, and thus more closely resembling the situation encountered by the user of the mobile device 1. Criteria based on user input may include criteria resulting in the most recent data items being returned, or the most popular.

In a next step 37, the data items identified by the search engine system 22 are ordered according to distances between the respective locations represented by the data stored in association with them and the location of the mobile device 1.

In a next step 38, the location-based information server 28 returns a message 39 including data identifying the, optionally filtered, data items stored in association with data specifying locations within the spatial range determined by at least the location of the mobile device 1 and the direction.

Figure 3:
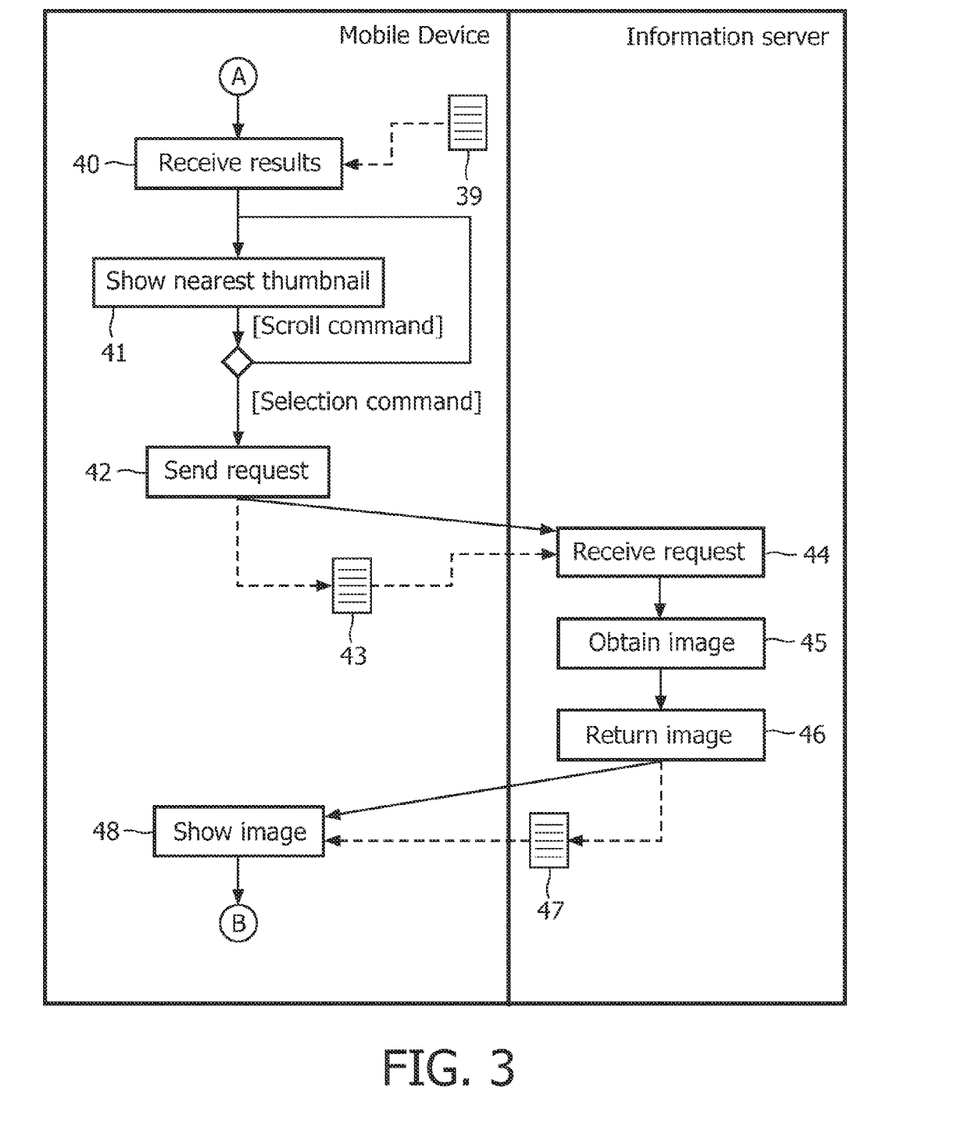
FIG. 3 is a flow chart of a first further part of the method, following the part illustrated in FIG. 2.

In an embodiment illustrated in FIG. 3, the mobile device 1 receives (step 40) the message 39 including the search results in the form of data representative of thumbnail images. These are versions of images identified by the location-based information server 28 and scaled down in size and/or resolution. The thumbnail images are provided in the order determined previously (step 37). The mobile device 1 shows the thumbnail images (step 41) in that order on the screen of the display device 13, in response to scrolling commands from the user. Upon receiving a selection command, a further message 42 requesting the full image is sent (step 43) to the location-based information server 28.

The location-based information server 28 receives the message 42, and obtains the image (step 45) from one of the web servers 19-21. In the illustrated embodiment, the full-size image is returned (step 46) to the mobile device 1 in a further message 47. The mobile device 1 then shows the full-size image (step 48).

In another embodiment, the location-based information server 28 sends the message 47 as an e-mail to the mail server 27, or makes it available for later download by the user at the personal computer 23. In this way, a hard-copy of the image can be made using the printer device 24. Alternatively, the user can compile a digital photo album for showing on the display device 26. Note that this is done without the need for a camera in the mobile device 1. The quality of the image in the digital album can be much higher than achievable with a simple image-capturing device in a mobile device 1 like a mobile phone. Incidentally, a simpler variant of this embodiment is conceivable in which the steps 41,43,44 giving the user a pre-view of a choice of images are omitted. This would be possible where the location-based information server 28 is able to determine the identity of the nearest object in sight according to the location data and direction specified by the mobile device 1.

Figure 4:
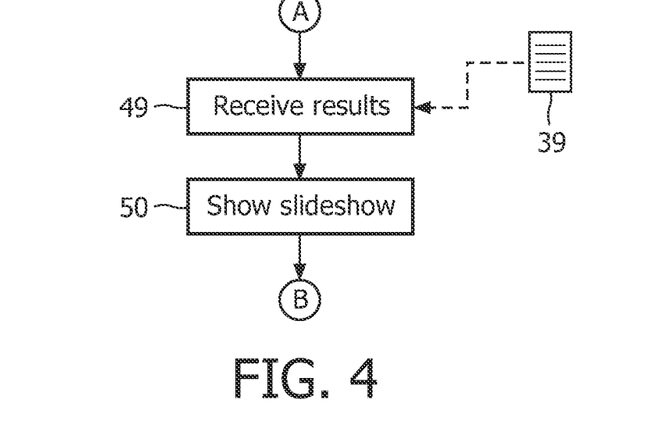
FIG. 4 is a flow chart of a second further part of the method, following the part illustrated in FIG. 2.

According to FIG. 4, the results returned (step 38) in the first message returned by the location-based information server 28 include a slide show, compiled by the location-based information server 28 by assembling the results in the order determined in the step 37 concerned. The mobile device 1 receives the results (step 49) and shows the slideshow (step 50). Instead of a slide show, a video sequence may be provided and shown. Alternatively, a sequence of audio tracks may be provided and played back using the audio output stage 11 and speaker 12. In the example of a slide show, the mobile device 1 can show images near to the user and move outwards in the direction in which the mobile device 1 is pointing. This enables a user to get a glimpse of what he or she could see when following that direction.

In another embodiment, the step 36 of searching in the collection of data items includes filtering, according to a criterion such as popularity or most recent date, the data items stored in association with data representative of locations within a spatial range determined by at least the direction and the co-ordinates determined in the preceding steps 30, 31. The mobile device 1 receives the results in a step 49 that includes receiving data representative of a route along the locations represented by the data stored in association with the data items found using the filter. In effect, the user is suggested a route along the locations associated with the most popular data items, e.g. images.

Figure 5:
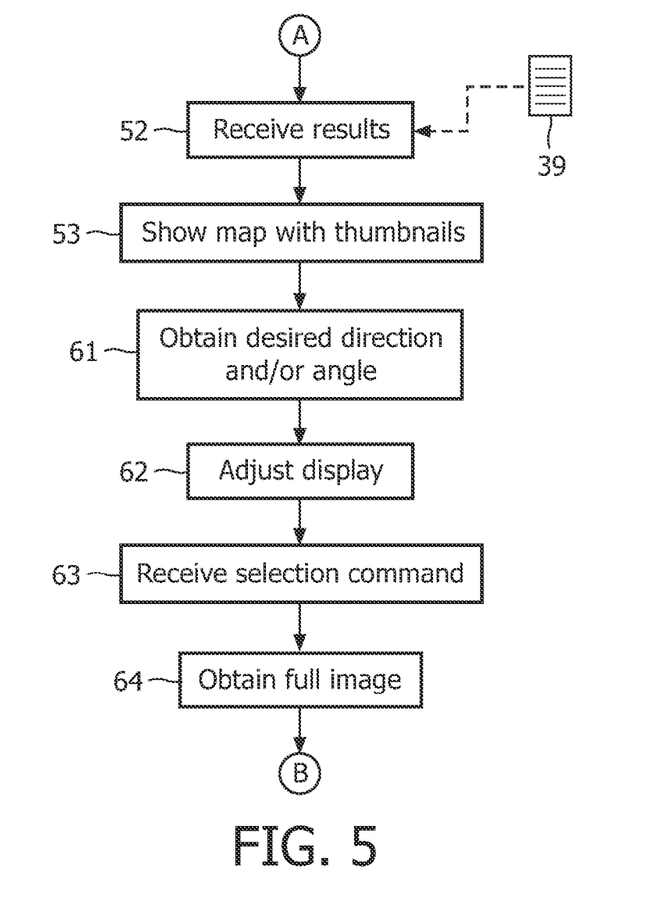
FIG. 5 is a flow chart of a third further part of the method, following a modified version of the part illustrated in FIG. 2.
Figure 6:
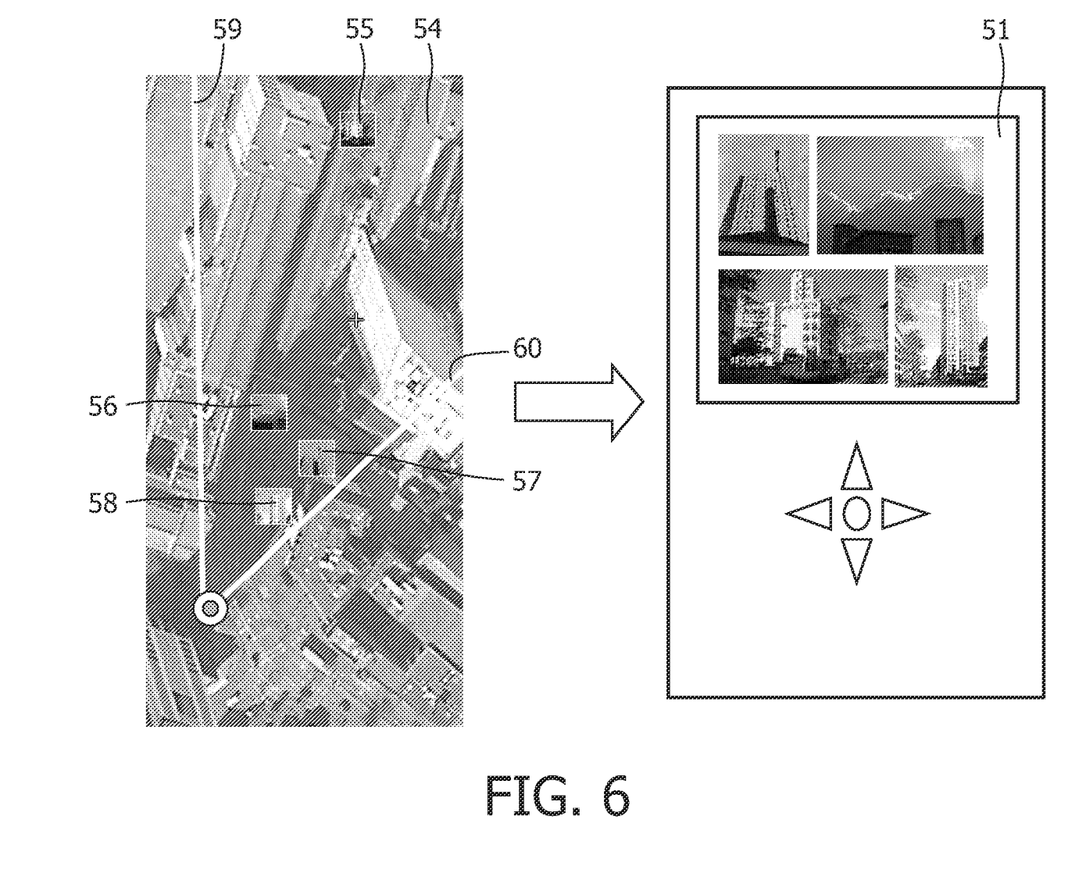
FIG. 6 is an illustration of a graphical user interface used in conjunction with the method part of FIG. 5, and of a resulting image collage.

FIGS. 5 and 6 illustrate an alternative embodiment, in which the mobile device 1 and location-based information server 28 co-operate to generate a collage 51, e.g. in a post card format. In this embodiment, the step 31 could initially be omitted. That is to say that the mobile device 1 and the location-based information server 28 jointly identify data items stored in association with data representative of locations within a spatial range determined by at least a direction and the co-ordinates. The location-based information server 28 initially identifies data items associated with locations within a certain distance to the location of the mobile device 1, and the latter then filters the results to obtain only those data items associated with locations in a certain direction relative to the mobile device 1.

Thus, the mobile device 1 receives the message 39 carrying the initial results (step 52), i.e. all data items associated with locations within a certain distance to the location of the mobile device 1, regardless of the direction in which they are located. It shows (step 53) a background image 54 with thumbnails 55-58 overlaid. The background image 54 can be an aerial photograph or map, for example.

A user is able to adjust the angle and/or orientation of a pair of half-lines 59, 60 intersecting at a point corresponding to the location of the mobile device 1. The user interface provided by the mobile device 1 enables the user to set a desired angle between, and an orientation of, the half-lines 59,60, so as to define a compass sector oriented according to a particular direction (indicated through the user interface or by re-orienting the mobile device 1) and having a dimension determined by the angle between the half-lines 59,60. The mobile device 1 obtains 61 the user input, and adjusts the display (step 62) to show only those thumbnails 55-58 associated with data defining locations within the sector defined by the half-lines 59,60. These steps 61, 62 are repeated as necessary, i.e. until the user confirms (step 63) the current settings. The full images represented by the thumbnails currently selected are then obtained (step 64) for assembly into the collage 51. The actual identification of relevant data items is thus adjusted in real-time in response to input defining a new direction.

In a variant of this embodiment, all steps of FIG. 5 are carried out on the personal computer 23. Moreover, the mobile device 1 is used to obtain a recording of at least one of an image, an image sequence and an audio sequence, using appropriate devices comprised in the mobile device 1. This recording is then combined with the data representative of the images obtained in the last step 64 illustrated in FIG. 5. This embodiment is interesting as a feature to be added to video editing software or applications for making photo albums.

A similar principle to the one used in the embodiment of FIG. 5 can be used in another embodiment (not shown), in which a system for searching in the collection of data items is caused to use data representative of the direction and the co-ordinates to identify data items stored in association with data representative of locations within a spatial range determined by the direction, the co-ordinates and the angle of the half-lines 59,60, each time new input defining a direction and/or input defining a new angle is received. Thus, the entire search is carried out anew. This type of method can be carried out relatively efficiently where the collection of data items associated with data representative of locations is stored in the data storage device 9 of the mobile device 1. In that case, the mobile device 1 performs the entire search. In any case, the results are, like in the other embodiments described herein, limited to those relevant to locations in a particular direction.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In an embodiment, the data representative of a direction and the data representative of co-ordinates defining a location are input by a user at the personal computer 23, instead of being determined using the GPS receiver 16 and the 6D-sensor 17. The search can still be carried out using the location-based information server 28, and the results may be provided to the personal computer 23, the mobile device 1, or both. Thus, variants of the methods outlined herein are useable to browse through recorded media in a virtual environment.

In another embodiment, the location-based information server 28 returns the data item associated with the nearest location within the spatial range determined at least partly by the direction and the co-ordinates communicated to it by the mobile device 1. Thus, the data item used by the mobile device 1 can be updated in real-time or quasi real-time in response to changes in the orientation of the mobile device 1.

In a further embodiment, information selected on the basis of at least one of the data items identified in a search of the collection of data items is provided with the search results. In particular, appropriate advertising information can be added to the data items returned with the search results.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. 'Computer programme' is to be understood to mean any software product stored on a computer-readable medium, such as an optical disk, downloadable via a network, such as the Internet, or marketable in any other manner.

The invention claimed is:

1. A method of searching in a collection of data items stored in association with data representative of locations, including:
    obtaining data representative of co-ordinates of a mobile device defining a location;
    determining data representative of a direction from an orientation of said mobile device;
    searching in the collection of data using the data representative of the direction and the co-ordinates to identify data items stored in the collection and known data types, wherein said known data types are based on a user input;
    determining data items within a spatial range centered on the co-ordinates of the location and defined with respect to the direction, wherein said search is performed using a plurality of grids within the spatial range, said grids being determined based on a distance from said co-ordinates of the location;
    ordering the identified data items according to distances of the identified data items and the co-ordinates of the location; and
    selectively presenting the ordered identified data items up to a maximum distance from the co-ordinates of the location, wherein said identified data items are presented in at least one of: a scaled down size and a scaled down resolution.

2. The method according to claim 1, including:
    obtaining data representative of an angle and using the angle as a field of view to define the spatial range.

3. The method according to claim 1, wherein the data items are identified by:
    identifying a set of data items stored in association with data representative of locations within a certain distance from the co-ordinates of the location; and identifying within the set of data items those stored in association with data representative of locations within a sector oriented according to the direction.

4. The method according to claim 1, wherein the data items are stored in association with separate respective items of metadata including the data representative of locations.

5. The method according to claim 1, further comprising:
obtaining input data representative of at least one of a date, a time, ambient conditions and data descriptive of properties of the data items stored in association with at least some of the data items; and
filtering the collection of data according to the input data.

6. The method according to claim 1, wherein at least the data representative of the co-ordinates defining a location are received in a communication from a remote device over a network.

7. The method according to claim 1, wherein at least the data representative of the co-ordinates are communicated to a remote system from the mobile device.

8. The method according to claim 7, wherein the data representative of the co-ordinates defining the location are obtained from a positioning system for locating the mobile device.

9. The method according to claim 7, wherein at least selected ones of the identified data items are received by the mobile device from the remote system over a network.

10. The method according to claim 7, wherein the data representative of a direction are obtained using at least one sensor for determining the orientation of the mobile device.

11. A mobile device, including:
a processor for obtaining data representative of co-ordinates of the mobile device determined by a positioning system; and
a processor for obtaining data representative of a direction and a known data type, wherein said direction is obtained from an orientation of said mobile device and said known data type is based on a user input,
wherein the mobile device is arranged to provide the data representative of the direction and the co-ordinates of the mobile device to a second system;
said second system comprising a processor:
searching in a collection of data to identify data items stored in association with data representative of physical locations within a spatial range centered on the co-ordinates of the mobile device and defined with respect to the direction and said known data types, wherein said search is performed using a plurality of grids within the spatial range, said grids being determined based on distance from said co-ordinates of the mobile device;
ordering the identified data items according to distances between the respective locations of the identified data items and the co-ordinates of the mobile device; and
selectively presenting the ordered identified data items up to a maximum distance from the co-ordinates of the mobile device, wherein said identified data items are presented in at least one of: a scaled down size and a scaled down resolution.

12. A mobile device configured to search in a collection of data items stored in association with data representative of locations, said mobile device comprising:
a processor executing the steps of:
obtaining data representative of co-ordinates defining a location of the mobile device and a data type wherein said data type is based on a user input;
determining data representative of a direction of the mobile device from an orientation of said mobile device;
searching in the collection of data items using the data representative of the co-ordinates of the mobile device and defined with respect to the direction and said data type, to identify data items stored in association with data representative of locations within a spatial range determined by at least the direction and the co-ordinates of the mobile device, wherein said search is performed using a plurality of grids within the spatial range, said grids being determined based on distance from said co-ordinates;
ordering the identified data items according to distances between the respective locations of the identified data items and the location of the mobile device; and
selectively presenting the ordered identified data items based on a maximum distance from the location defined by the co-ordinates of the mobile device, wherein said identified data items are presented in at least one of: a scaled down size and a scaled down resolution.

13. A computer program including a set of instructions, capable, when incorporated in a machine-readable medium stored on a non-transitory medium and loaded into a mobile device comprising a processing system, the method causing the processing system to:
obtain data representative of co-ordinates of a mobile device defining a location;
determining data representative of a direction from an orientation of said mobile device;
searching in the collection of data using the data representative of the direction and the co-ordinates to identify data items stored in the collection and known data types, wherein said known data types are based on a user input;
determining data items within a spatial range centered on the co-ordinates of the location and defined with respect to the direction, wherein said search is performed using a plurality of grids within the spatial range, said grids being determined based on a distance from said co-ordinates of the location;
ordering the identified data items according to distances of the identified data items and the co-ordinates of the location; and
selectively presenting the ordered identified data items up to a maximum distance from the co-ordinates of the location, wherein said identified data items are presented in at least one of: a scaled down size and a scaled down resolution.

* * * * *